(12) United States Patent
Shimizu et al.

(10) Patent No.: US 9,873,819 B2
(45) Date of Patent: Jan. 23, 2018

(54) CURABLE COMPOSITION AND PHOTOCHROMIC COMPOSITION

(71) Applicant: TOKUYAMA CORPORATION, Shunan-shi, Yamaguchi (JP)

(72) Inventors: Yasutomo Shimizu, Shunan (JP); Katsuhiro Mori, Shunan (JP)

(73) Assignee: Tokuyama Corporation, Shunan-shi, Yamaguchi (JP)

( * ) Notice: Subject to any disclaimer, the term of this patent is extended or adjusted under 35 U.S.C. 154(b) by 0 days.

(21) Appl. No.: 15/321,665

(22) PCT Filed: Jul. 17, 2015

(86) PCT No.: PCT/JP2015/071177
§ 371 (c)(1),
(2) Date: Dec. 22, 2016

(87) PCT Pub. No.: WO2016/013677
PCT Pub. Date: Jan. 28, 2016

(65) Prior Publication Data
US 2017/0210943 A1 Jul. 27, 2017

(30) Foreign Application Priority Data
Jul. 22, 2014 (JP) ................... 2014-149261

(51) Int. Cl.
| | |
|---|---|
| *G02B 5/23* | (2006.01) |
| *C09D 183/14* | (2006.01) |
| *C08K 5/18* | (2006.01) |
| *C08K 5/357* | (2006.01) |
| *C08K 5/1545* | (2006.01) |
| *C09K 9/02* | (2006.01) |
| *C09D 5/32* | (2006.01) |
| *C08G 77/52* | (2006.01) |
| *G02B 5/22* | (2006.01) |
| *C08G 77/00* | (2006.01) |

(52) U.S. Cl.
CPC .......... *C09D 183/14* (2013.01); *C08G 77/52* (2013.01); *C08K 5/1545* (2013.01); *C08K 5/18* (2013.01); *C08K 5/357* (2013.01); *C09D 5/32* (2013.01); *C09K 9/02* (2013.01); *G02B 5/223* (2013.01); *G02B 5/23* (2013.01); *C08G 77/80* (2013.01); *C09K 2211/1007* (2013.01); *C09K 2211/1033* (2013.01); *C09K 2211/1088* (2013.01)

(58) Field of Classification Search
CPC .... C09D 183/14; C08K 5/357; C08K 5/1545; C08K 5/18; G02B 5/22; G02B 5/32; G02B 5/23; G02B 5/223; G02B 1/10; C08G 77/52; C09K 9/02; C09K 2211/1088
USPC ........................................ 359/244
See application file for complete search history.

(56) References Cited

U.S. PATENT DOCUMENTS

| | | |
|---|---|---|
| 2004/0137362 A1 | 7/2004 | De et al. |
| 2004/0220292 A1 | 11/2004 | Momoda et al. |
| 2005/0263745 A1 | 12/2005 | Momoda et al. |
| 2010/0230650 A1 | 9/2010 | Nagoh et al. |
| 2013/0015416 A1 | 1/2013 | Takenaka et al. |
| 2014/0146285 A1* | 5/2014 | Otani ............... G02B 1/10 351/159.61 |
| 2015/0368552 A1 | 12/2015 | Izumi et al. |
| 2016/0002524 A1 | 1/2016 | Shimizu et al. |
| 2016/0222285 A1 | 8/2016 | Shimizu et al. |

FOREIGN PATENT DOCUMENTS

| | | |
|---|---|---|
| JP | 64-24809 A | 1/1989 |
| JP | 10-223044 A | 8/1998 |
| JP | 2002-25335 A | 1/2002 |
| JP | 2006-504827 A | 2/2006 |
| JP | 2015-74199 A | 4/2015 |
| WO | WO 01/05854 A1 | 1/2001 |
| WO | WO 03/011967 A1 | 2/2003 |

(Continued)

OTHER PUBLICATIONS

Written Opinion of the International Search Authority issued in PCT/JP2015/071177 (Forms PCT/IB/338 and PCT/ISA/237) dated Feb. 2, 2017.

*Primary Examiner* — Euncha Cherry
(74) *Attorney, Agent, or Firm* — Birch, Stewart, Kolasch & Birch, LLP

(57) ABSTRACT

A curable composition having excellent storage stability and capable of forming a cured product having excellent scratch resistance.

The composition comprises a silsesquioxane monomer having a radically polymerizable group in the molecule and a content of a component having a molecular weight measured by gel permeation chromatography (GPC) of not less than 10,000 of less than 9 mass % and a bifunctional polymerizable monomer represented by the following formula (1).

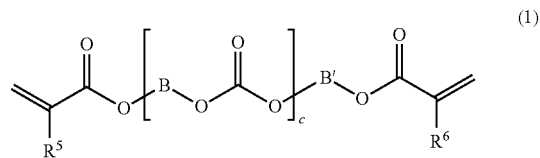

(1)

(wherein B and B' are each an linear or branched alkylene group having 2 to 15 carbon atoms, "c" is an average value of 1 to 20, when a plurality of B's are existent, B's may be the same or different, and $R^5$ and $R^6$ are each a hydrogen atom or methyl group).

13 Claims, No Drawings

(56) References Cited

FOREIGN PATENT DOCUMENTS

| WO | WO 2009/075388 A1 | 6/2009 |
| WO | WO 2011/125956 A1 | 10/2011 |
| WO | WO 2013/008825 A1 | 1/2013 |
| WO | WO 2014/136804 A1 | 9/2014 |
| WO | WO 2014/136919 A1 | 9/2014 |
| WO | WO 2015/016313 A1 | 2/2015 |
| WO | WO 2015/068798 A1 | 5/2015 |

* cited by examiner ial density" hereinafter) should be high, (III) the speed from the stoppage of the application of ultraviolet light to the time when the compound returns to its original state (to be referred to as "fading speed" hereinafter) should be high, (IV) the repeat durability of the reversible functions of (II) and (III) should be high, (V) storage stability should be high,
CURABLE COMPOSITION AND PHOTOCHROMIC COMPOSITION

TECHNICAL FIELD

The present invention relates to a curable composition comprising silsesquioxane, a photochromic composition comprising this composition and a photochromic compound, and a photochromic laminate having a coating agent and a photochromic coating layer.

BACKGROUND ART

Inorganic glass has high transparency, heat resistance and dimensional stability and therefore has been used in a wide variety of industrial fields. Although inorganic glass has such excellent features, it has defects that it has high specific gravity and is easily broken as it has low impact resistance. Therefore, transparent plastics have been attracting attention in all the industrial fields from the viewpoints of lightweight and safety.

One of the application fields of the above transparent plastics is the field of spectacle lenses, and there are known spectacle lenses made of (meth)acrylate resin and polycarbonate resin.

One type of the above spectacle lenses is photochromic spectacle lenses. The photochromic spectacle lenses serve as sunglasses whose lenses are quickly colored outdoors where they are irradiated with light including ultraviolet radiation like sunlight and as ordinary transparent spectacles whose lenses are faded indoors where there is no irradiation, and demand for the photochromic spectacle lenses is growing nowadays.

As the method of manufacturing the above photochromic spectacle lenses, there are one in which a photochromic compound such as a chromene compound is dissolved in a monomer and the monomer is polymerized to obtain a photochromic lens directly (to be referred to as "kneading method" hereinafter), one in which a coating layer having photochromic properties (to be also referred to as "photochromic coating layer" hereinafter) is formed on the surface of a plastic having no photochromic properties (to be referred to as "coating method" hereinafter), and one in which a monomer having photochromic properties is poured into a space between a plastic lens and a glass mold to be polymerized and cured (to be referred to as "lamination method" hereinafter). The technologies of the above kneading method (WO01/005854 and WO09/075388), the coating method (WO11/125956 and WO03/011967) and the lamination method (WO01/005854) are proposed in these patent documents.

For these photochromic compounds and plastic optical articles comprising these compounds and having photochromic properties, the following properties are required from the viewpoint of a photochromic function: (I) the degree of coloration at a visible light range before ultraviolet light is applied (to be referred to as "initial coloration" hereinafter) should be low, (II) the degree of coloration upon exposure to ultraviolet light (to be referred to as "color optical density" hereinafter) should be high, (III) the speed from the stoppage of the application of ultraviolet light to the time when the compound returns to its original state (to be referred to as "fading speed" hereinafter) should be high, (IV) the repeat durability of the reversible functions of (II) and (III) should be high, (V) storage stability should be high, (VI) the compound should be easily molded into an optical article, and (VII) the mechanical strength of an optical article should be high.

With these technologies as background, there are proposed photochromic plastic lenses (optical materials) comprising a chromene compound which is hardly decomposed by light and rarely deteriorates in color development performance even when sunlight or light similar to sunlight is applied thereto continuously. The development of photochromic curable compositions comprising various polymerizable monomers and a photochromic compound (especially a chromene compound) in the kneading method and the coating method is now under way.

WO01/005854 and WO09/075388 disclose photochromic curable compositions comprising a specific (meth)acrylic polymerizable monomer having a (meth)acrylic group (general name for methacrylic group and acrylic group) and a chromene compound. Since the kneading method has a feature that photochromic plastic lenses can be mass-produced at a low cost by using a glass mold, it is now the major production method of photochromic plastic lenses.

However, the kneading method requires a matrix having excellent mechanical strength in order to obtain the strength of a lens substrate and has a problem that photochromic properties must be sacrificed in any way.

WO11/125956 and WO03/011967 disclose a method in which a photochromic curable composition is applied to a plastic lens by spin coating to be cured optically (to be also referred to as "coating method" hereinafter) and a method in which a photochromic curable composition is poured into a space between a plastic lens held by a elastomer gasket, adhesive tape or spacer and a glass mold to be polymerized and cured (to be also referred to as "two-stage polymerization method" hereinafter). Laminates having excellent photochromic properties can be manufactured by using these photochromic curable compositions.

However, due to growing demand for the improvement of the performance of photochromic plastic lenses, a photochromic curable composition from which a higher-performance lens than before can be manufactured has been desired.

To provide high color optical density and high fading speed which are the excellent properties of photochromic spectacles to a photochromic coating layer formed by the above coating method, the photochromic coating layer must be made soft. As a result, the mechanical strength of the photochromic coating layer lowers, whereby the photochromic coating layer is easily scratched in the step of processing a lens, for example, the step of polishing the rear surface of a lens to obtain desired power and the step of trimming the periphery of a lens in accordance with a frame form.

To cope with the above problem, the applicant previously proposed a photochromic curable composition which comprises a silsesquioxane compound forming a hard structure to achieve mechanical strength and photochromic properties at the same time (refer to WO13/008825).

However, as a result of further studies conducted by the inventors of the present invention, when the above photochromic curable composition comprising a silsesquioxane compound is stored for a certain period of time, it was found that the phase separation and clouding of the composition may occur, an appearance defect such as cracking readily occurs in the surface of a photochromic coating layer formed by using this photochromic curable composition, and satisfactory surface hardness is not obtained. Therefore, it was revealed that there is room for the improvement of the storage stability of the above photochromic curable composition comprising a silsesquioxane compound after it is stored for a long time.

Disclosure of the Invention

It is an object of the present invention to provide a curable composition capable of forming a cured product having excellent storage stability and excellent scratch resistance.

The inventors of the present invention conducted intensive studies to attain the above object. First of all, when they studied the cause of phase separation and clouding after the long-term storage of the above curable composition, they found that these are apt to occur in a combination of a specific bifunctional polymerizable monomer and a silsesquioxane compound and further that when the amount of a high-molecular weight component contained in the silsesquioxane compound is large, phase separation and clouding tend to occur remarkably.

Based on the above knowledge, when various studies were made on a combination of a bifunctional polymerizable monomer and a silsesquioxane compound, the molecular weight of the silsesquioxane compound and the molecular weight and the content of the high-molecular weight component in the silsesquioxane compound to solve the above problem, it was found that cracking at the time of forming a coating layer can be suppressed by using a specific (meth)acrylate monomer having a polycarbonate group as the bifunctional polymerizable monomer and that phase separation and clouding can be suppressed by specifying the molecular weight of the silsesquioxane monomer and the molecular weight and the content of the high-molecular weight component contained in the silsesquioxane monomer. Thus, the present invention was accomplished based on these findings.

That is, the present invention is a curable composition comprising (A) a silsesquioxane monomer having a radically polymerizable group in the molecule, a weight average molecular weight measured by gel permeation chromatography (GPC) of 2,000 to 4,700 and a content of a component having a weight average molecular weight of not less than 10,000 of less than 9 mass % and (B) a bifunctional polymerizable monomer represented by the following formula (1).

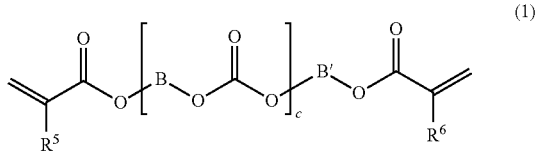

wherein B and B' are each a linear or branched alkylene group having 2 to 15 carbon atoms, "c" is an average value of 1 to 20, when a plurality of B's are existent, B's may be the same or different, and $R^5$ and $R^6$ are each a hydrogen atom or methyl group.

BEST MODE FOR CARRYING OUT THE INVENTION

The curable composition of the present invention is characterized in that it comprises a specific (meth)acrylate monomer having a polycarbonate group as a bifunctional polymerizable monomer and a silsesquioxane monomer having a relatively low weight average molecular weight and a low content of a high-molecular weight component.

Although the reason that the above effect is obtained by using the photochromic curable composition of the present invention is not found yet, the inventors of the present invention assume it as follows.

That is, since the above curable composition is cured by polymerization, it comprises a monomer having a polymerizable group, and a polymerization initiator and additives for carrying out polymerization efficiently. Meanwhile, a free hydroxyl group bonded to a Si atom is existent in the silsesquioxane monomer. Therefore, it is assumed that while the curable composition comprising a silsesquioxane monomer having a free hydroxyl group is stored, polycondensation between silsesquioxane monomers proceed due to the existence of the above hydroxyl group, thereby increasing the amount of the high-molecular weight component obtained by polymerizing the silsesquioxane monomers.

Since the high-molecular weight component contained in the silsesquioxane monomer has low compatibility with the bifunctional polymerizable monomer having a polycarbonate group, it is assumed that the phase separation and clouding of the curable composition occur due to an increase in the amount of the high-molecular weight component.

A description is subsequently given of each of the components constituting the curable composition of the present invention.

<(A) Silsesquioxane Monomer Having a Radically Polymerizable Group in the Molecule, a Weight Average Molecular Weight Measured by Gel Permeation Chromatography (GPC) Of 2,000 to 4,700 and a Content of a Component Having a Weight Average Molecular Weight of Not Less Than 10,000 of Less Than 9 Mass %>

In the present invention, the silsesquioxane monomer having a radically polymerizable group in the molecule (may be referred to as "component (A)" hereinafter) is a monomer in which some of substituents bonded to the silicon atom of a siloxane compound having a Si—O bond as the main skeleton are radically polymerizable groups. In the present invention, the radically polymerizable group refers to a radically polymerizable group such as (meth) acrylic group or allyl group, and a group containing the radically polymerizable group. The above silsesquioxane monomer is represented by the following formula (2).

$(R^4—SiO_{3/2})_d$ (2)

In the above formula, a plurality of $R^4$'s may be the same or different and at least three $R^4$'s are radically polymerizable groups, and $R^4$'s other than the radically polymerizable groups are each a hydrogen atom, alkyl group, cycloalkyl group, alkoxy group or phenyl group, and "d" is the degree of polymerization which is an integer of 6 to 100.

Examples of the radically polymerizable group represented by $R^4$ include groups having a (meth)acrylic group such as (meth)acrylic group, (meth)acryloxypropyl group and (3-(meth)acryloxypropyl)dimethylsiloxy group; groups having an allyl group such as allyl group, allylpropyl group and allylpropyldimethylsiloxy group; groups having a vinyl group such as vinyl group, vinylpropyl group and vinyldimethylsiloxy group; groups having a cyclohexenyl group such as (4-cyclohexenyl)ethyldimethylsiloxy group; groups having a norbornenyl group such as norbornenylethyl group and norbornenylethyldimethylsiloxy group; and groups having a maleimide group such as N-maleimidepropyl group. Out of these, groups having a (meth)acrylic group are particularly preferred as high film strength can be obtained while excellent photochromic properties are developed in the photochromic curable composition.

The alkyl group represented by $R^4$ is preferably an alkyl group having 1 to 10 carbon atoms. Examples of the alkyl group having 1 to 10 carbon atoms include methyl group, ethyl group, n-propyl group, isopropyl group, n-butyl group, sec-butyl group, tert-butyl group, n-pentyl group, n-hexyl group, n-octyl group and isooctyl group.

The cycloalkyl group is preferably a cycloalkyl group having 3 to 8 carbon atoms. Examples of the cycloalkyl group having 3 to 8 carbon atoms include cyclopropyl group, cyclobutyl group, cyclopentyl group, cyclohexyl group, cycloheptyl group and cyclooctyl group.

The alkoxy group is preferably an alkoxy group having 1 to 6 carbon atoms. Examples of the alkoxy group having 1 to 6 carbon atoms include methoxy group, ethoxy group, n-propoxy group, isopropoxy group, n-butoxy group, sec-butoxy group and tert-butoxy group.

"d" is the degree of polymerization which is an integer of 6 to 100.

In the present invention, the above silsesquioxane monomer has a content of a component having a weight average molecular weight measured by gel permeation chromatography (to be abbreviated as "GPC" hereinafter) of not less than 10,000 of less than 9 mass %. When the content of the silsesquioxane monomer having a weight average molecular weight of not less than 10,000 is set to less than 9 wt %, the compatibility with the bifunctional polymerizable monomer which will be described hereinafter of the above silsesquioxane monomer is improved and the storage stability of the curable composition becomes high.

The weight average molecular weight measured by GPC is a weight average molecular weight in terms of polystyrene and calculated based on the elution time of a polystyrene authentic preparation whose weight average molecular weight is known. The content is a value obtained from (area-10000/area-all)×100(%) when the area of the silsesquioxane molecule having a weight average molecular weight of not less than 10,000 is represented by "area-10,000" and the area of the whole silsesquioxane monomer measured is represented by "area-all".

Preferably, the above component (A) has a weight average molecular weight of 2,000 to 4,700, preferably 3,000 to 4,300 from the viewpoint of storage stability. The weight average molecular weight is a value obtained from a calibration curve formed by using polystyrene as an authentic preparation.

In general, the silsesquioxane monomer can be obtained by carrying out the hydrolytic reaction and condensation reaction of an alkoxysilane compound in the presence of a catalyst. It is known that, according to hydrolytic reaction and condensation reaction conditions, a cage-like structure, ladder-like structure, incomplete cage-like structure that some of siloxane bonds of a cage-like structure are cleaved, or random structure that an alkoxy silane compound is randomly condensed is formed. In the present invention, if the content of the component having a weight average molecular weight measured by GPC of not less than 10,000 is less than 9 mass %, preferably less than 8 mass %, a silsesquioxane monomer having a single structure or a mixture of a plurality of structures may be used regardless of the structure.

Out of the structures of the above silsesquioxane monomer, a silsesquioxane monomer having a ladder-like structure and/or a random structure is preferred from the viewpoints of cost and the mechanical strength of the obtained cured product. Further, the content of the above silsesquioxane monomer is preferably 60 to 90 mass %, most preferably 70 to 80 mass %.

<(B) Bifunctional Polymerizable Monomer Represented by the Following Formula (1)>

The component (B) in the present invention is a bifunctional polymerizable monomer having a polycarbonate group represented by the following formula (1).

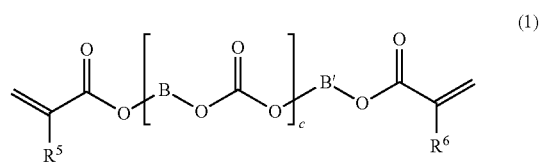

(1)

In the above formula, B and B' are each a linear or branched alkylene group having 2 to 15 carbon atoms, "c" is an average value of 1 to 20, when a plurality of B's are existent, B's may be the same or different, and $R^5$ and $R^6$ are each a hydrogen atom or methyl group.

In the bifunctional polymerizable monomer represented by the above formula (1), B and B' are each preferably a linear or branched alkylene group having 3 to 9 carbon atoms, more preferably a linear or branched alkylene group having 4 to 7 carbon atoms from the viewpoint of surface hardness. Examples of the alkylene group include trimethylene group, tetramethylene group, pentamethylene group, hexamethylene group, octamethylene group, nonamethylene group, dodecamethylene group, pentadecamethylene group, 1-methyltriethylene group, 1-ethyltriethylene group and 1-isopropyltriethylene group.

The polycarbonate (meth)acrylate having the above structure is generally obtained as a mixture which differs in the repetition number "c" of the carbonate unit. In this mixture, the average value represented by "c" is 1 to 20, preferably 2 to 8, more preferably 2 to 5 as described above. Further, it is preferred that a polycarbonate (meth)acrylate having a largest number of the repetitions of the carbonate unit of 30 or less, especially 15 or less, most preferably 10 or less should be used in order to adjust the aforementioned characteristic properties on condition that the average value "c" falls within the above range.

As described above, there is a case where a plurality of group B's are existent according to the number of repetitions of the carbonate unit. In this case, B's may be the same or different. From the viewpoint of compatibility with another monomer, a mixture of different B's is preferably existent. In the case of a mixture of different B's, it is preferred that the content of an alkylene group having 3 to 5 carbon atoms should be 10 to 90 mol % and the content of an alkylene group having 6 to 9 carbon atoms should be 10 to 90 mol % of the total of all B's. It is most preferred that the content of an alkylene group having 4 to 5 carbon atoms should be 10 to 90 mol % and the content of an alkylene group having 6 to 7 carbon atoms should be 10 to 90 mol % of the total of all B's. By using a bifunctional polymerizable monomer having such B's, compatibility with another polymerizable monomer is improved advantageously.

<Mixing Ratio of Components (A) and (B)>

The mixing ratio of the monomer components (A) and (B) in the curable composition of the present invention should be suitably determined according to use purpose. From the viewpoints of the storage stability of the curable composition and the surface hardness of the obtained cured product, when the total content of the monomer components (A) and (B) is 100 parts by mass, preferably, the content of the component (A) is 10 to 90 parts by mass and the content of the component (B) is 10 to 90 parts by mass, more preferably, the content of the component (A) is 20 to 70 parts by mass and the content of the component (B) is 30 to 80 parts by mass, and most preferably, the content of the component (A) is 25 to 60 parts by mass and the content of the component (B) is 40 to 75 parts by mass.

<(C) Bifunctional Polymerizable Monomer Represented by the Following Formula (3)>

Although the curable composition of the present invention comprises the above components (A) and (B), it may comprise another component so as to improve physical properties according to use purpose. It is preferred that the curable composition should comprise a bifunctional polymerizable monomer represented by the following formula (3) (may be referred to as "component (C)" hereinafter) since the effect of improving the compatibility of all the monomers of the curable composition and the effect of improving the surface hardness of the obtained cured product are obtained.

(polyethoxy)phenyl]propane (a+b=20). 2,2-bis[4-methacryloxy(polyethoxy)phenyl]propane (a+b=10) is particularly preferably used from the viewpoints of mechanical strength, surface hardness and the suppression of cracking.

<Mixing Ratio of Components (A), (B) and (C)>

When the monomer component (C) is further contained in the curable composition of the present invention, the mixing ratio of the monomer components (A), (B) and (C) may be suitably determined according to use purpose. However, from the viewpoints of the storage stability of the curable composition and the surface hardness and appearance of the obtained cured product, when the total content of the monomer components (A), (B) and (C) is 100 parts by mass, preferably, the content of the component (A) is 3 to 30 parts by mass, the content of the component (B) is 2 to 40 parts by mass and the content of the component (C) is 30 to 95 parts by mass, more preferably, the content of the component (A) is 5 to 25 parts by mass, the content of the component (B) is 5 to 35 parts by mass and the content of the component (C) is 40 to 90 parts by mass, and, most preferably, the

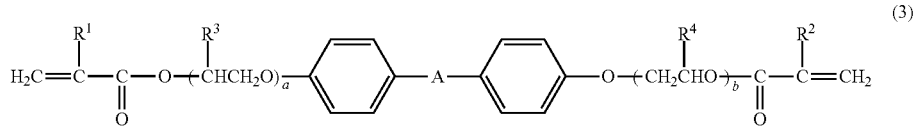

(3)

In the above formula, $R^1$ and $R^2$ are each a hydrogen atom or methyl group, $R^3$ and $R^4$ are each a hydrogen atom or methyl group, A is any one of groups represented by the following formulas, and "a" and "b" are each an integer of 1 or more, with the proviso that when both $R^1$ and $R^2$ are methyl groups, (a+b) is an average value of 2 or more and less than 30, when $R^1$ is a methyl group and $R^2$ is a hydrogen atom, (a+b) is an average value of 2 or more and less than 25, and when both $R^1$ and $R^2$ are hydrogen atoms, (a+b) is an average value of 2 or more and less than 20.

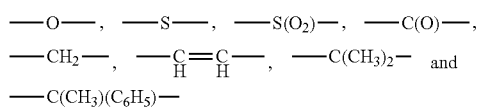

When a photochromic curable composition is prepared by containing (D) a photochromic compound which will be described hereinafter in the curable composition of the present invention, the solubility in the curable composition of the photochromic compound is greatly improved by containing the above component (C) advantageously. The component (C) is obtained as a mixture of molecules which differ in molecular weight. Therefore, "a" and "b" are given as average values.

Examples of the bifunctional polymerizable monomer as the component (C) include bisphenol A dimethacrylate, 2,2-bis(4-methacryloyloxyethoxyphenyl)propane, 2,2-bis(3,5-dibromo-4-methacryloyloxyethoxyphenyl)propane, 2,2-bis(4-methacryloyloxydipropoxyphenyl)propane, bisphenol A diacrylate, 2,2-bis[4-methacryloxy(polyethoy)phenyl] propane (a+b=10), 2,2-bis[4-methacryloxy(polyethoxy)phenyl]propane (a+b=17), 2,2-bis[4-methacryloxy(polyethoxy) phenyl]propane (a+b=30), 2,2-bis[4-acryloxy(polyethoxy) phenyl]propane (a+b=10) and 2,2-bis[4-acryloxy content of the component (A) is 10 to 20 parts by mass, the content of the component (B) is 10 to 30 parts by mass and the content of the component (C) is 50 to 80 parts by mass.

<Other Polymerizable Monomers>

In the curable composition of the present invention, a polyfunctional polymerizable monomer, a bifunctional polymerizable monomer other than the components (B) and (C), urethane (meth)acrylate, and polymerizable monomers such as an epoxy polymerizable monomer and a vinyl monomer may be used as polymerizable monomers other than the above component (C).

<Polyfunctional Polymerizable Monomer>

An example of the polyfunctional polymerizable monomer is a polyfunctional polymerizable monomer represented by the following formula (4). By mixing a polyfunctional polymerizable monomer represented by the following formula (4), the effect of further improving the compatibility of the curable composition and the effect of improving the surface hardness of the obtained cured product can be expected.

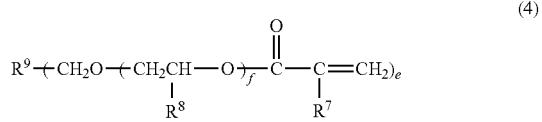

(4)

In the above formula, $R^7$ is a hydrogen atom or methyl group, $R^8$ is a hydrogen atom or alkyl group having 1 to 2 carbon atoms, $R^9$ is a trivalent to hexavalent organic group having 1 to 10 carbon atoms, "e" is an average value of 0 to 3 and "f" is a number of 3 to 6.

$R^9$ in the above formula (4) is a trivalent to hexavalent hydrocarbon group having 1 to 10 carbon atoms, trivalent to hexavalent organic group having 1 to 10 carbon atoms and containing an oxygen atom, or trivalent to hexavalent organic group containing a urethane bond. $R^8$ is preferably a methyl group.

Preferred examples of the polyfunctional polymerizable monomer represented by the following formula (4) include trimethylolpropane trimethacrylate, trimethylolpropane triacrylate, tetramethlolmethane trimethacrylate, tetramethlolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate and ditrimethylolpropane tetraacrylate. These polyfunctional polymerizable monomers may be used in combination of two or more.

Out of these, trimethylolpropane trimethacrylate and ditrimethylolpropane tetramethacrylate are particularly preferred.

When a photochromic curable composition is prepared by containing (D) a photochromic compound which will be described hereinafter in the curable composition of the present invention, it is preferred to contain the above polyfunctional polymerizable monomer in the curable composition as the photochromic properties of the cured product are greatly improved.

<Bifunctional Polymerizable Monomer Other than Components (B) and (C)>

A preferred example of the bifunctional polymerizable monomer other than the components (B) and (C) is a bifunctional polymerizable monomer represented by the following formula (5). By mixing the bifunctional polymerizable monomer represented by the following formula (5), the effect of further improving the compatibility of the curable composition and the effect of reducing the viscosity of the curable composition can be expected.

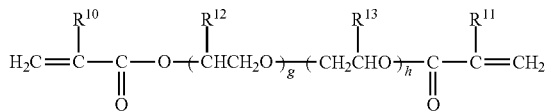

(5)

In the above formula, $R^{10}$, $R^{11}$, $R^{12}$ and $R^{13}$ are each independently a hydrogen atom or methyl group.

The bifunctional polymerizable monomer represented by the above formula (5) is generally obtained as a mixture of molecules which differ in molecular weight. Therefore, "g" and "h" are given as average values. To obtain the above effects, preferably, "g" is 0 to 25, "h" is 0 to 25, and (g+h) is 1 to 25, particularly preferably 3 to 15.

Examples of the bifunctional polymerizable monomer represented by the above formula (5) include ethylene glycol dimethacrylate, diethylene glycol dimethacrylate, triethylene glycol dimethacrylate, tetraethylene glycol dimethacrylate, polyethylene glycol dimethacrylate (average number of repetitions of ethyleneoxy group (g+h):9, average molecular weight: 536), polyethylene glycol dimethacrylate (average number of repetitions of ethyleneoxy group (g+h):14, average molecular weight: 736), polyethylene glycol dimethacrylate (average number of repetitions of ethyleneoxy group (g+h):23, average molecular weight: 1,136), tripropylene glycol dimethacrylate, tetrapropylene glycol dimethacrylate, polypropylene glycol dimethacrylate (average number of repetitions of propyleneoxy group (g+h):9, average molecular weight: 662), ethylene glycol diacrylate, diethylene glycol diacrylate, triethylene glycol diacrylate, tetraethylene glycol diacrylate, polyethylene glycol diacrylate (average number of repetitions of ethyleneoxy group (g+h):9, average molecular weight: 508), polyethylene glycol diacrylate (average number of repetitions of ethyleneoxy group (g+h):14, average molecular weight: 708), dipropylene glycol diacrylate, tripropylene glycol diacrylate, tetrapropylene glycol diacrylate, polypropylene glycol diacrylate (average number of repetitions of propyleneoxy group (g+h):7, average molecular weight: 536) and polypropylene glycol diacrylate (average number of repetitions of propyleneoxy group (g+h): 12, average molecular weight: 808).

Particularly preferred are tetraethylene glycol diacrylate, polyethylene glycol diacrylate (average number of repetitions of ethyleneoxy group (g+h):9, average molecular weight: 508), polyethylene glycol dimethacrylate (average number of repetitions of ethyleneoxy group (g+h): 9, average molecular weight: 536) and polyethylene glycol dimethacrylate (average number of repetitions of ethyleneoxy group (g+h):14, average molecular weight: 736).

When a photochromic curable composition is prepared by containing (D) a photochromic compound which will be described hereinafter in the curable composition of the present invention, it is preferred to contain the above bifunctional polymerizable monomer in the curable composition as the color optical density of a cured product thereof is greatly improved.

<Urethane (Meth)Acrylate>

When urethane (meth)acrylate is contained in the curable composition of the present invention, the mechanical strength of a cured product of the composition can be further improved.

Examples of the above urethane (meth)acrylate include polyfunctional urethane (meth)acrylate monomers which are reaction mixtures obtained by reacting hexamethylene diisocyanate, isophorone diisocyanate, lysine isocyanate, 2,2,4-hexamethylene diisocyanate, isopropylidenebis-4-cyclohexyl isocyanate, dicyclohexylmethane diisocyanate, norbornene diisocyanate or methylcyclohexane diisocyanate with a polyalkylene glycol having a recurring unit of ethylene oxide, propylene oxide or hexamethylene oxide having 2 to 4 carbon atoms, polyester diol such as polycaprolactone diol, polyfunctional polyol such as polycarbonate diol or polybutadiene diol, or diol such as pentaerythritol, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, 1,4-cyclohexanedimethanol, glycerin, trimethylolpropane or pentaerythritol to obtain an urethane prepolymer and further reacting the prepolymer with 2-hydroxy (meth)acrylate, or reaction mixtures obtained by directly reacting the above diisocyanate with 2-hydroxy (meth)acrylate. Particularly preferred examples of the urethane (meth)acrylate include U-108A (average molecular weight of about 1,600), UA4200 (average molecular weight of about 1,300), UA4400 (average molecular weight of about 1,300), UA160TM (average molecular weight of about 1,600), U108 (average molecular weight of about 1,600), UA-122P (average molecular weight of about 1,100), UA-5201 (average molecular weight of about 1,000), U-2THA (average molecular weight of about 1,300), U-4HA (average molecular weight of about 596), U-6HA (average molecular weight of about 1,019), U-6LPA (average molecular weight of about 818), U-15HA (average molecular weight of about 2,300), U-200PA, UA-511, U-412A, UA-4100, UA-2235PE, UA-6100, UA-6200, UA-4000 and UA-512 (all of these are manufactured by Shin-Nakamura Chemical Co., Ltd.), EB4858 (average molecular weight of about 454) (manufactured by Daicel-UCB Co., Ltd.), and UX-3204, UX-4101, UX-6101, UX-7101, UX-8101, UX-0937, UXF-4002, DPHA-40H, UX-5000, UX-5003D and UX-5005 (all of these are manufactured by Nippon Kayaku Co., Ltd.).

<Polymerizable Monomer Such as Epoxy Polymerizable Monomer>

The durability of the obtained cured product can be improved by containing an epoxy polymerizable monomer represented by the following formula (6) in the curable composition of the present invention.

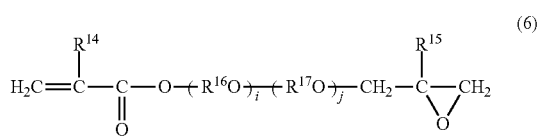

(6)

In the above formula, $R^{14}$ and $R^{15}$ are each a hydrogen atom or methyl group, $R^{16}$ and $R^{17}$ are each an alkylene group having 1 to 4 carbon atoms which may be substituted by a hydroxyl group, or a group represented by the following formula (7), and "i" and "j" are each an average value of 0 to 20.

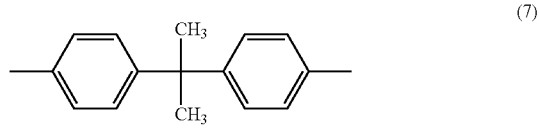

(7)

Examples of the alkylene group represented by $R^{16}$ and $R^{17}$ include methylene group, ethylene group, propylene group, butylene group, trimethylene group and tetramethylene group. The compound represented by the above formula (6) may be obtained as a mixture of molecules which differ in molecular weight. Therefore, "i" and "j" are given as average values.

Examples of the compound represented by the above formula (6) include glycidyl methacrylate, glycidyloxymethyl methacrylate, 2-glycidyloxyethyl methacrylate, 3-glycidyloxypropyl methacrylate, 4-glycidyloxybutyl methacrylate, polyethylene glycol glycidyl methacrylate having an average molecular weight of 406, polyethylene glycol glycidyl methacrylate having an average molecular weight of 538, polyethylene glycol glycidyl methacrylate having an average molecular weight of 1,022, polypropylene glycol glycidyl methacrylate having an average molecular weight of 664, bisphenol A-monoglycidyl ether-methacrylate, 3-(glycidyl-2-oxyethoxy)-2-hydroxypropyl methacrylate, glycidyl acrylate, glycidyloxymethyl acrylate, 2-glycidyloxyethyl acrylate, 3-glycidyloxypropyl acrylate, 4-glycidyloxybutyl acrylate, polyethylene glycol glycidyl acrylate having an average molecular weight of 406, polyethylene glycol glycidyl acrylate having an average molecular weight of 538, polyethylene glycol glycidyl acrylate having an average molecular weight of 1,022, 3-(glycidyloxy-1-isopropyloxy)-2-hydroxypropyl acrylate and 3-(glycidyloxy-2-hydroxypropyloxy)-2-hydroxypropyl acrylate. Out of these, glycidyl methacrylate, glycidyloxymethyl methacrylate, 2-glycidyloxyethyl methacrylate, 3-glycidyloxypropyl methacrylate, glycidyl acrylate and glylcidyl methacrylate are preferred, and glycidyl methacrylate is particularly preferred.

<Polymerizable Monomer Such as Vinyl Monomer>

The moldability of the obtained cured product can be improved by adding a polymerizable monomer such as a vinyl monomer to the curable composition of the present invention. Although known compounds may be used as the vinyl monomer without restriction, a compound which serves as a polymerization control agent is preferably used. Examples of the vinyl monomer include α-methylstyrene and α-methylstyrene dimer, and a combination of α-methylstyrene and α-methylstyrene dimer is particularly preferred.

<Other Monomers>

Examples of monomers which may be preferably used in the curable composition of the present invention as other monomers include unsaturated carboxylic acids such as methoxydiethylene glycol methacrylate, methoxypolyethylene glycol methacrylate having an average molecular weight of 293, methoxypolyethylene glycol methacrylate having an average molecular weight of 468, methoxypolyethylene glycol methacrylate having an average molecular weight of 1,068, phenoxyethyl methacrylate, methoxypolyethylene glycol acrylate having an average molecular weight of 218, methoxypolyethylene glycol acrylate having an average molecular weight of 454, methoxypolyethylene glycol acrylate having an average molecular weight of 1,054, phenoxyethylene glycol acrylate, phenoxydiethylene glycol acrylate, phenoxypolyethylene glycol acrylate having an average molecular weight of 412, 2-hydroxy methacrylate, 2-hydroxy acrylate, 1,3-butanediol dimethacrylate, 1,4-butanediol dimethacrylate, 1,6-hexanediol dimethacrylate, 1,9-nonanediol dimethacrylate, 1,10-decanediol dimethacrylate, 2-methyl-1,8-octanediol dimethacrylate, 1,3-butanediol diacrylate, 1,4-butanediol diacrylate, 1,6-hexanediol diacrylate, 1,9-nonanediol diacrylate, 1,10-decanediol diacrylate, 2-methyl-1,8-octanediol diacrylate, tripropylene glycol diacrylate, tetrapropylene glycol diacrylate, pentapropylene glycol diacrylate, 2,2-bis[4-acryloxy(polyethoxy)phenyl] propane having an average molecular weight of 466, 2,2-bis[4-acryloxy(polyethoxy)phenyl]propane having an average molecular weight of 512, 2,2-bis[4-methacryloxy (polyethoxy)phenyl]propane having an average molecular weight of 452, 2,2-bis[4-methacryloxy(polyethoxy)phenyl] propane having an average molecular weight of 478, 2,2-bis[4-methacryloxy(polyethoxy)phenyl]propane having an average molecular weight of 540, neopentyl glycol dimethacrylate, tricyclodecane dimethanol dimethacrylate, glycerin dimethacrylate, tricyclodecane dimethanol diacrylate, neopentyl glycol diacrylate, 9,9-bis[4-(2-acryloyloxyethoxy)phenyl]fluorene, polyester oligomer hexaacrylate, caprolactone modified dipentaerythritol hexaacrylate, tetrafunctional polyester oligomer having an average molecular weight of 2,500 to 3,500 (EB80 of Daicel UCB: 4 (meth) acrylic groups), tetrafunctional polyester oligomer having an average molecular weight of 6,000 to 8,000 (EB450 of Daicel UCB (4 (meth)acrylic groups), hexafunctional polyester oligomer having an average molecular weight of 45,000 to 55,000 (EB1830 of Daicel UCB (6 (meth)acrylic groups), tetrafunctional polyester oligomer having an average molecular weight of about 10,000 (GX8488B of DKS Co., Ltd. (6 (meth)acrylic groups)), bis(2-methacryloyloxyethylthioethyl)sulfide, bis(methacryloyloxyethyl)sulfide, bis (acryloyloxyethyl)sulfide, 1,2-bis(methacryloyloxyethylthio)ethane, 1,2-bis(acryloyloxyethyl)ethane, bis(2-methacryloyloxyethylthioethyl)sulfide, bis(2- acryloyloxyethylthioethyl)sulfide, 1,2-bis (methacryloyloxyethylthioethylthio)ethane, 1,2-bis (acryloyloxyethylthioethylthio)ethane, 1,2-bis (methacryloyloxyisopropylthioisopropyl)sulfide, 1,2-bis (acryloyloxyisopropylthioisopropyl)sulfide, stearyl methacrylate, lauryl methacrylate, methyl acrylate, ethyl acrylate, butyl acrylate, octyl acrylate, lauryl acrylate, acrylic acid, methacrylic acid and maleic anhydride; ester compounds of acrylic acid or methacrylic acid such as methyl methacrylate, benzyl methacrylate, phenyl methacrylate and 2-hydroxyethyl methacrylate; ester compounds of thioacrylic acid or thiomethacrylic acid such as methylthio acrylate, benzylthio acrylate and benzylthio methacrylate; and 2-isocyanatoethyl methacrylate, γ-methacryloxypropyl trimethoxysilane and γ-methacryloxypropylmethyl dimethoxysilane.

<Mixing Ratio when Other Polymerizable Monomers are Contained>

Although the mixing ratio when the above other polymerizable monomers are contained in the curable composition of the present invention may be suitably determined according to use purpose, the other polymerizable monomers are preferably contained in a total amount of 30 to 70 parts by mass based on 100 parts by mass of the total of the components (A), (B) and (C) and the other polymerizable monomers from the viewpoints of the storage stability of the curable composition, the surface hardness and appearance of the obtained cured product and the development of effects obtained by containing the other polymerizable monomers.

<(D) Photochromic Compound and Amount Thereof>

The above curable composition of the present invention is transparent and has excellent mechanical strength and high storage stability when it is stored for a long time and may be used for various applications of transparent plastics such as plastic spectacle lenses.

By further containing (D) a photochromic compound in the above curable composition of the present invention, there can be provided a photochromic curable composition having excellent storage stability after it is stored for a long time while there is provided a cured product having excellent mechanical strength and photochromic properties advantageously.

A description is subsequently given of the photochromic compound (may be simply referred to as "component (D)" hereinafter). Photochromism is the reversible function of a certain compound that it changes its color swiftly upon exposure to light including ultraviolet light such as sunlight or light from a mercury lamp and returns to its original color when it is put in the dark by stopping its exposure to light. A compound having this property is a photochromic compound.

As photochromic compounds having this property, fulgide compounds, chromene compounds and spirooxazine compounds are well known and may be used in the present invention without restriction. They may be used alone or in combination of two or more. The above fulgide compounds, chromene compounds and spirooxazine compounds are disclosed in, for example, JP-A 2-28154, JP-A 62-288830, WO94/22850 and WO96/14596.

Compounds having excellent photochromic properties include compounds which were newly discovered by the inventors of the present invention, such as compounds disclosed in, for example, JP-A 2001-114775, JP-A 2001-031670, JP-A 2001-011067, JP-A 2001-011066, JP-A 2000-347346, JP-A 2000-344762, JP-A 2000-344761, JP-A 2000-327676, JP-A 2000-327675, JP-A 2000-256347, JP-A 2000-229976, JP-A 2000-229975, JP-A 2000-229974, JP-A 2000-229973, JP-A 2000-229972, JP-A 2000-219687, JP-A 2000-219686, JP-A 2000-219685, JP-A 11-322739, JP-A 11-286484, JP-A 11-279171, JP-A 10-298176, JP-A 09-218301, JP-A 09-124645, JP-A 08-295690, JP-A 08-176139, JP-A 08-157467, U.S. Pat. Nos. 5,645,767, 5,658,501, 5,961,892, 6,296,785, Japanese Patent No. 4424981, Japanese Patent No. 4424962, WO2009/136668, WO2008/023828, Japanese Patent No. 4369754, Japanese Patent No. 4301621, Japanese Patent No. 4256985, WO2007/086532, JP-A 2009-120536, JP-A 2009-67754, JP-A 2009-67680, JP-A 2009-57300, Japanese Patent No. 4195615, Japanese Patent No. 4158881, Japanese Patent No. 4157245, Japanese Patent No. 4157239, Japanese Patent No. 4157227, Japanese Patent No. 4118458, JP-A 2008-74832, Japanese Patent No. 3982770, Japanese Patent No. 3801386, WO2005/028465, WO2003/042203, JP-A 2005-289812, JP-A 2005-289870, JP-A 2005-112772, Japanese Patent No. 3522189, WO2002/090342, Japanese Patent No. 3471073, JP-A 2003-277381, WO2001/060811, WO2000/071544, WO2005/028465, WO2011/16582, WO2011/034202, WO2012/121414 and WO2013/042800.

Out of these photochromic compounds, one or more chromene compounds having an indeno(2,1-f)naphtho(1,2-b)pyran skeleton are preferably used from the viewpoints of photochromic properties such as color optical density, initial coloration, durability and fading speed. Out of these chromene compounds, compounds having a molecular weight of not less than 540 are more preferred as they are particularly excellent in color optical density and fading speed. Examples thereof are given below.

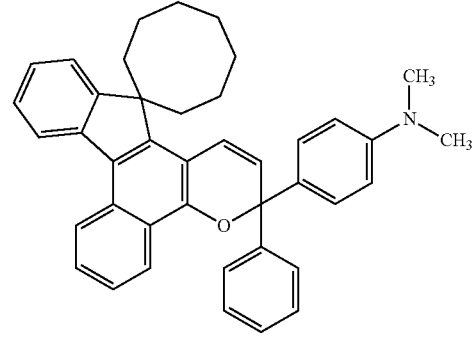

PC 1

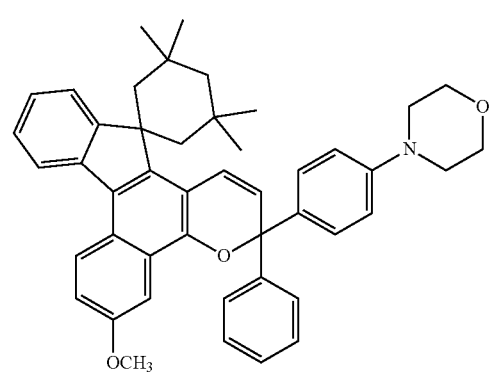

PC 2

PC 3

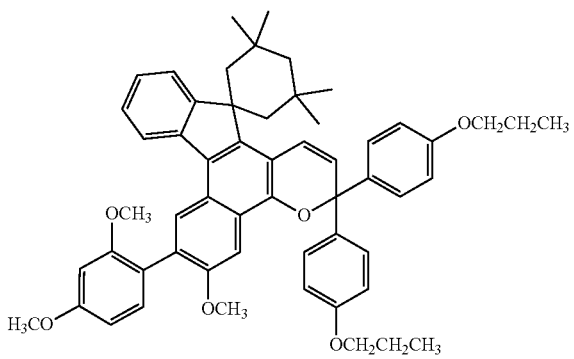

The amount of the photochromic compound to be mixed with the above curable composition is set to ensure that desired photochromic properties are obtained. In general, the photochromic compound is used in an amount of 0.1 to 10 parts by mass based on 100 parts by mass of the total of all the polymerizable monomers. To obtain a plastic lens (photochromic laminate) of the lamination method by the coating method or the two-stage polymerization method which will be described hereinafter, the amount of the photochromic compound is preferably 0.1 to 7 parts by mass, more preferably 1 to 5 parts by mass based on 100 parts by mass of the total of the above polymerizable monomers from the viewpoint of the development of satisfactory photochromic properties as a plastic lens.

<Other Compounding Agents>

The curable composition of the present invention and the photochromic curable composition may comprise various compounding agents as long as the effect of the present invention is not impaired. As the compounding agents, for example, stabilizers and additives such as a release agent, ultraviolet absorbent, infrared absorbent, ultraviolet stabilizer, antioxidant, coloring inhibitor, antistatic agent, fluorescent dye, dye, pigment and flavoring agent, and a polymerization control agent may be optionally mixed.

When an ultraviolet stabilizer is mixed with the photochromic composition comprising the photochromic compound as the component (D) before use, the durability of the photochromic compound can be further improved advantageously. As the ultraviolet absorbent, a hindered amine optical stabilizer, a hindered phenol antioxidant and a sulfur-based antioxidant are preferably used. As the hindered amine optical stabilizer which is not particularly limited, bis(1,2,2,6,6-pentamethyl-4-piperidyl)sebacate is preferred from the viewpoint of preventing the deterioration of the photochromic compound. Also, hindered amine-based optical stabilizers marketed under the trade names of the ADK STAB LA-52, LA-57, LA-62, LA-63, LA-67, LA-77, LA-82 and LA-87 of ADEKA Corporation may be preferably used.

As the hindered phenol antioxidant which is not particularly limited, 2,6-di-t-butyl-4-methyl-phenol, IRGANOX245 of CIBA SPECIALTY CHEMICALS INC. (ethylenebis(oxyethylene)bis[3,5-tert-butyl-4-hydroxy-m-toluyl)propionate], IRGANOX 1076 of CIBA SPECIALTY CHEMICALS INC. (octadecyl-3-(3, 5-di-tert-butyl-4-hydroxyphenyl)propionate), IRGANOX1010 of CIBA SPECIALTY CHEMICALS INC. (pentaerythritol tetrakis[3-(3, 5-di-tert-butyl-4-hydroxyphenyl)propionate]) and IRGANOX 1035, 1075, 1098, 1135, 1141, 1222, 1330, 1425, 1520, 259, 3114, 3790, 5057 and 565 of CIBA SPECIALTY CHEMICALS INC. are preferred from the viewpoint of preventing the deterioration of the photochromic compound.

The amount of this ultraviolet stabilizer is preferably 0.01 to 20 parts by mass, more preferably 0.1 to 10 part by mass based on 100 parts by mass of the total of the above polymerizable monomers.

The curable composition of the present invention is preferably mixed with a radical polymerization initiator. Typical examples of the radical polymerization initiator include thermal polymerization initiators such as diacyl peroxides including benzoyl peroxide, p-chlorobenzoyl peroxide, decanoyl peroxide, lauroyl peroxide and acetyl peroxide; peroxy esters including t-butylperoxy-2-ethyl hexanoate, t-butyl peroxyneodecanoate, cumyl peroxyneodecanoate and t-butyl peroxybenzoate; percarbonates including diisopropyl peroxydicarbonate and di-sec-butyl peroxydicarbonate; and azo compounds including azobisisobutyronitrile. Examples of the optical polymerization initiator include acetophenone-based compounds such as 1-phenyl-2-hydroxy-2-methylpropan-1-one, 1-hydroxycyclohexylphenyl ketone and 1-(4-isopropylphenyl)-2-hydroxy-2-methylpropan-1-one; α-dicarbonyl-based compounds such as 1,2-diphenylethanedione and methylphenyl glyoxylate; and acylphosphine oxide-based compounds such as 2,6-dimethylbenzoyl diphenylphosphine oxide, 2,4,6-trimethylbenzoyl diphenylphosphine oxide, 2,4,6-trimethylbenzoyl diphenylphosphinic acid methyl ester, 2,6-dichlorobenzoyl diphenylphosphine oxide and 2,6-dimethoxybenzoyl diphenylphosphine oxide. These polymerization initiators may be used alone or in combination of two or more. A thermal polymerization initiator and an optical polymerization initiator may be used in combination. When an optical polymerization initiator is used, a known polymerization accelerator such as a tertiary amine may be used.

When the above radical polymerization initiator is used in the present invention, the amount of the polymerization initiator is preferably 0.001 to 10 parts by mass, more preferably 0.01 to 5 parts by mass based on 100 parts by mass of the radically polymerizable component (A).

A thiol such as t-dodecyl mercaptan may be added as a polymerization control agent.

The curable composition of the present invention can be produced by mixing together the silsesquioxane monomer (A), the bifunctional polymerizable monomer (B), the monomer component (C) and the photochromic compound (D) and optionally other polymerizable monomers, the above compounding agents and the radical polymerization initiator in accordance with a known method.

<Cured Product, Production Method Thereof>

A known radical polymerization method may be employed as the polymerization method for obtaining a cured product by curing the curable composition of the present invention. As polymerization initiating means, heat, the irradiation of ultraviolet-ray (UV-ray), α-ray, β-ray or γ-ray, or both of them may be used. At this point, a radical polymerization initiator such as the above-described thermal polymerization initiator or optical polymerization initiator is preferably mixed with the curable composition of the present invention. When the photochromic curable composition obtained by containing the photochromic compound as the component (D) in the curable composition is used, a photochromic cured product is obtained.

When the curable composition of the present invention is thermally polymerized, temperature out of polymerization conditions has an influence on the properties of the obtained cured product. Although temperature is not limited unconditionally as this temperature condition is influenced by the type and amount of the thermal polymerization initiator and the types of the monomers, so-called "tapered polymerization" that polymerization is started at a relatively low temperature, the temperature is gradually raised and the curable composition is cured at a high temperature at the end of polymerization is preferably carried out. Since polymerization time differs according to various factors like temperature, it is preferred to determine the optimum time according to these conditions in advance. The conditions are preferably selected to ensure that polymerization is completed in 2 to 24 hours.

When the curable composition of the present invention is optically polymerized, UV intensity out of the polymerization conditions has an influence on the properties of the obtained cured product. Although this illumination intensity condition cannot be limited unconditionally as it is influenced by the type and amount of the optical polymerization initiator and the types of the monomers, this condition is preferably selected to ensure that 50 to 500 mW/cm$^2$ UV light having a wavelength of 365 nm is irradiated for 0.5 to 5 minutes.

A thermal polymerization initiator and an optical polymerization initiator may be used in combination. When an optical polymerization initiator is used, a known polymerization accelerator such as a tertiary amine may be used. When the two-stage polymerization method is employed, a thermal polymerization initiator is preferably mixed with the curable composition, and when the coating method is employed, an optical polymerization initiator is preferably mixed with the curable composition.

<Photochromic Cured Product, Production Method Thereof>

The photochromic curable composition of the present invention may be preferably used in any one of the above methods of obtaining a photochromic cured product and a photochromic laminate, that is, the kneading method, the coating method and the lamination method. The method of obtaining a photochromic laminate will be described in detail hereinunder. A description is first given of a plastic lens substrate in use.

<Plastic Lens Substrate>

The plastic lens substrate to be laminated with a photochromic coating layer made of the photochromic composition of the present invention is not particularly limited, and a known substrate may be used.

Examples of the above plastic lens substrate include (meth)acrylic-based resin, polycarbonate-based resin, allyl-based resin, thiourethane-based resin, urethane-based resin and thioepoxy-based resin. In the present invention, any one of these plastic lens substrates may be used. A plastic lens substrate obtained by forming a hard coating layer on the plastic lens substrate may also be used.

The shape of the plastic lens substrate used in the present invention is not particularly limited and may be a known shape. The plastic lens substrate is various in shape according to the eyesight of a user, the shape of a glass mold at the time of molding a plastic lens substrate and productivity. For example, it may be a minus lens having a small center thickness and a large edge thickness as a spectacle lens for near sight or a plus lens having a large center thickness and a small edge thickness as a spectacle lens for far sight. Further, it may have such a shape that the edge part of the plastic lens substrate is inclined downward (side opposite to the side for the lamination of the photochromic coating layer) toward the periphery, depending on a mold at the time of molding the plastic lens substrate (this shape of the edge part may be referred to as "beveled shape" hereinafter). An advantage obtained by this beveled shape is that the amount of a liquid remaining in the edge part can be reduced in the coating method.

<Application to Plastic Lens Having a Primer Coating Layer>

In the embodiment of the present invention, a primer coating layer may be formed between the plastic lens substrate and the photochromic coating layer. Known polyurethane resins may be used for the primer coating layer. A primer coating layer made of a moisture curable polyurethane resin/its precursor as disclosed by Japanese Patent No. 4405833 or water dispersion urethane emulsion as disclosed by Japanese Patent No. 5016266 and Japanese Patent No. 5084727 is particularly preferred from the viewpoint of adhesion.

Although a polyurethane resin is dispersed in water finally, the water dispersion polyurethane resin emulsion may be mixed with water, a leveling agent and an organic solvent as required to obtain a primer coating composition which is then applied to a plastic lens substrate and dried to form a primer coating layer. The thickness of the primer coating layer is preferably 1 to 10 μm.

The photochromic composition of the present invention becomes effective when it is applied to a plastic lens substrate having the above primer coating layer. Specifically, it becomes effective especially when the lens substrate is a high-power plastic lens or a plastic lens having a beveled shape. As a matter of course, the photochromic coating layer is formed on the primer coating layer.

A photochromic coating layer made of the photochromic composition is formed on the primer coating layer made of polyurethane resin on the surface of the above plastic lens substrate, a plastic lens having an ordinary shape, a high-power plastic lens, a plastic lens having a beveled shape or these lenses (photochromic laminate is produced). A detailed description is subsequently given of the method of forming the photochromic coating layer on these lens substrates. Examples of the method of producing the laminate include a coating method and a two-stage polymerization method.

<Coating Method>

To manufacture a photochromic laminate by the coating method, after the photochromic composition of the present invention is mixed with an optical polymerization initiator, the photochromic composition is applied to a plastic lens substrate by spin coating, placed in an inert gas such as nitrogen and then irradiated with UV-rays, thereby obtaining the photochromic laminate by the coating method. To enhance adhesion between the photochromic coating layer and the plastic lens substrate, the photochromic laminate is preferably heated at 80 to 120° C. for 0.5 to 5 hours. The photochromic laminate consisting of the plastic lens substrate, the optionally formed primer coating layer and the photochromic coating layer in this order can be thus obtained. The thickness of the photochromic coating layer formed by the coating method is not particularly limited but preferably 10 to 70 μm.

<Two-stage Polymerization Method>

To manufacture a photochromic laminate by the two-stage polymerization method, cast polymerization in which the photochromic curable composition of the present invention prepared by mixing a thermal polymerization initiator is injected into a space between an elastomer gasket, spacer or glass mold held by adhesive tape and a plastic lens substrate to be polymerized and cured in an air furnace and the obtained laminate is taken out from the glass molds is employed. When an optical polymerization initiator is used, UV irradiation is carried out for the whole glass mold, and then the cured product is taken out from the glass molds. The temperature for polymerization and curing is not particularly limited but preferably changes from 20 to 120° C. when thermal polymerization is carried out. In the case of optical polymerization, after optical polymerization, the laminate is preferably heated at 80 to 120° C. for 0.5 to 5 hours. The photochromic laminate consisting of the plastic lens substrate, the optionally formed primer coating layer and the photochromic coating layer in this order can be thus obtained. The thickness of the photochromic coating layer formed by the two-stage polymerization method is not particularly limited but preferably 100 to 1,000 μm.

The photochromic laminate can be formed by placing the photochromic composition of the present invention on the plastic lens substrate and curing it in accordance with the above method. The photochromic composition of the present invention is designed to improve the strength of the photochromic coating layer itself so as to suppress the production of a crack when this laminate is formed.

<Characteristic Properties of Photochromic Laminate, Post-Processing>

The photochromic laminate obtained by polymerizing the photochromic composition of the present invention in accordance with the above method has excellent surface hardness, can suppress an appearance defect such as a crack, and can provide a photochromic plastic lens having excellent photochromic properties.

Further, the photochromic laminate obtained by the above method may be subjected to the following treatments according to purpose. That is, it may be dyed with a dye such as a disperse dye and subjected to an antireflection treatment or antistatic treatment such as the application of a silane coupling agent or a hard coating agent comprising silicon, zirconium, antimony, aluminum, tin or tungsten sol as the main component, the vapor deposition of a thin film of a metal oxide such as $SiO_2$, $TiO_2$ or $ZrO_2$, or the formation of a thin film of an organic polymer by coating, and a secondary treatment.

EXAMPLES

The following examples are provided for the purpose of further illustrating the present invention but are in no way to be taken as limiting. The molecular weight by gel permeation chromatography and the contents of the ladder-like structure and random structure of the silsesquioxane monomer were measured by the following methods.

That is, Waters 2695 Separate Module (of Nihon Waters K.K.) was used as a liquid chromatograph, Shodex GPCKF802.5 (exclusion limit molecular weight: 20,000, manufactured by Showa Denko K.K.) was used as a column, and Waters 2414 RI detector (manufactured by Nihon Waters K.K.) was used as a detector. The measurement was carried out by using tetrahydrofuran as a developing solution at a flow rate of 1 ml/min, an injection amount of 20 μl, a column temperature of 40° C. and a silsesquioxane monomer concentration in the injected liquid of 0.5 wt %. A calibration curve was formed by using polystyrene (molecular weight: 11,600, 5,050, 2,400, 1,680) as a standard sample to obtain weight average molecular weight by comparative conversion.

Further, as a result of the measurement of the silsesquioxane monomer measured under the above conditions, the content was obtained from (area-10000/area-all)×100 (content (%)) when the area of the silsesquioxane molecule having a molecular weight of not less than 10,000 was represented by "area-10000" and the area of the whole silsesquioxane monomer measured was represented by "area-all".

As a result of the measurement of the silsesquioxane monomer measured under the above conditions, the content of the cage-like structure was obtained from (area-cage-like structure/area-all)×100 (content (%)) and the total content of the ladder-like structure and the random structure was obtained from (area-ladder-like structure, random structure/area-all)×100 (content (%)) when the area of the silsesquioxane having a molecular weight of not more than 2,200 was taken as the area of the cage-like structure and represented by (area-cage-like structure), the area of the silsesquioxane having a molecular weight of more than 2,200 was taken as the total area of the ladder and the random structures and represented by "area-ladder-like structure, random structure), and the area of the whole silsesquioxane monomer measured was represented by "area-all".

<(A) Synthesis of Silsesquioxane Monomer Having a Radically Polymerizable Group in the Molecule and a Content of a Component Having a Molecular Weight Measured by Gel Permeation Chromatography of Not Less than 10,000 of Less than 9 Mass %>

300 ml of ethanol and 54 g (3.0 mol) of water were added to 248 g (1.0 mol) of 3-trimethoxysilylpropyl methacrylate, and 0.20 g (0.005 mol) of sodium hydroxide as a catalyst was added to carry out a reaction at 35° C. for 5 hours. After the disappearance of the raw materials was confirmed, the reaction product was neutralized with dilute hydrochloric acid, and 174 ml of toluene, 174 ml of heptane and 174 g of water were added to remove a water layer. Thereafter, an organic layer was rinsed until the water layer became neutral, and the solvent was concentrated to obtain a silsesquioxane monomer (PMS1). The disappearance of the raw materials was confirmed by $^1$H-NMR.

When the obtained silsesquioxane monomer (PMS1) was analyzed by gel permeation chromatography (GPC), it had a content of a component having a weight average molecular weight of not less than 10,000 of 7.1 mass % and a weight average molecular weight of 4,700. When the mixing ratio of the cage-like structure, the ladder-like structure and the random structure was calculated by GPC, the content of the cage-like structure was 22% and the total content of the ladder-like structure and the random structure was 78%.

<Synthesis PMS 2 to 7>

PMS 2 to 7 were synthesized in the same manner as PMS1 except that reaction conditions shown in Table 1 were used. The reaction conditions and the analytical results of the obtained PMS 2 to 7 are shown in Table 1.

TABLE 1

| | Reaction conditions | | GPC analytical results | | | |
|---|---|---|---|---|---|---|
| | Temperature (° C.) | Time (hours) | Content of component having a weight average molecular weight of not less than 10,000 (mass %) | Weight average molecular weight | Content of cage-like structure (%) | Total content of ladder-like structure and random structure (%) |
| PMS1 | 35 | 5 | 7.1 | 4,700 | 22 | 78 |
| PMS2 | 40 | 5 | 4.2 | 4,300 | 23 | 77 |
| PMS3 | 45 | 5 | 2.7 | 4,000 | 25 | 75 |
| PMS4 | 55 | 4 | 0.0 | 3,000 | 35 | 65 |
| PMS5 | 68 | 4 | 0.0 | 2,000 | 40 | 60 |
| PMS6 | 30 | 5 | 9.1 | 5,200 | 20 | 80 |
| PMS7 | 73 | 4 | 0.0 | 1,800 | 50 | 50 |

<Preparation of Curable Composition>

The abbreviations and names of compounds used in the following examples are given below.

(B) Bifunctional Polymerizable Monomer Represented by the Above Formula (1)

M-1; diacrylate obtained by using a polycarbonate diol having a number average molecular weight of 500

M-2; diacrylate obtained by using a polycarbonate diol having a number average molecular weight of 800

<Synthesis Method of M-1>

108 g (2.5 mol) of acrylic acid, 300 g of benzene, 11 g (0.06 mol) of p-toluenesulfonic acid and 0.3 g (700 ppm (based on a polycarbonate diol) of p-methoxyphenol were added to 300 g (0.6 mol) of a polycarbonate diol (number average molecular weight of 500) obtained by phosgenating hexamethylene glycol (50 mol %) and pentamethylene glycol (50 mol %) to carry out a reaction under reflux. Water produced by the reaction was co-boiled together with a solvent, only water was removed to the outside of the system by a separator, and the solvent was returned to a reaction vessel. The conversion of the reaction was confirmed by checking the amount of water removed from the reaction system, and the reaction was terminated when it was confirmed that 21.6 g of water was removed from the reaction system. Thereafter, the reaction product was dissolved in 600 g of benzene, neutralized with 5% sodium hydrogen carbonate and washed with 300 g of 20% brine 5 times. Benzene was distilled off from the remaining organic phase to obtain 210 g of a transparent liquid M-1.

<Synthesis Method of M-2>

108 g (2.5 mol) of acrylic acid, 480 g of benzene, 11 g (0.06 mol) of p-toluenesulfonic acid and 0.34 g (700 ppm (based on a polycarbonate diol)) of p-methoxyphenol were added to 480 g (0.6 mol) of a polycarbonate diol (number average molecular weight of 800) obtained by phosgenating hexamethylene glycol (50 mol %) and pentamethylene glycol (50 mol %) to carry out a reaction under reflux. Water produced by the reaction was co-boiled together with a solvent, only water was removed to the outside of the system by a separator, and the solvent was returned to a reaction vessel. The conversion of the reaction was confirmed with the amount of water removed from the reaction system, and the reaction was terminated when it was confirmed that 21.6 g of water was removed from the reaction system. Thereafter, the reaction product was dissolved in 600 g of benzene, neutralized with 5% sodium hydrogen carbonate and washed with 300 g of 20% brine 5 times. Benzene was distilled off from the remaining organic phase to obtain 320 g of a transparent liquid M-2.

(C) Bifunctional Polymerizable Monomer Represented by the Above Formula (3)

BPE500: 2,2-bis[4-(methacryloxy.polyethoxy)phenyl]propane (average chain length of ethylene glycol chain: 10, average molecular weight: 804)

BPE2: 2,2-bis[4-methacryloxy(polyethoxy)phenyl]propane (g+h-20, average molecular weight: 1,244)

Other Polymerizable Monomers

TMPT: trimethylolpropane trimethacrylate

D-TMP: ditrimethylolpropane tetramethacrylate

14G: polyethylene glycol dimethacrylate (average chain length of ethylene glycol chain: 14, average molecular weight: 736)

A400: polyethylene glycol diacrylate (average chain length of ethylene glycol chain: 9, average molecular weight: 508)

9G: polyethylene glycol dimethacrylate (average chain length of ethylene glycol chain: 9, average molecular weight: 536)

GMA: glycidyl methacrylate

MA1: γ-methacryloxypropyl trimethoxysilane

MA2: 2-isocyanatoethyl methacrylate

MS: α-methyl styrene

MSD: α-methyl styrene dimer (D) Photochromic Compound

PC 1

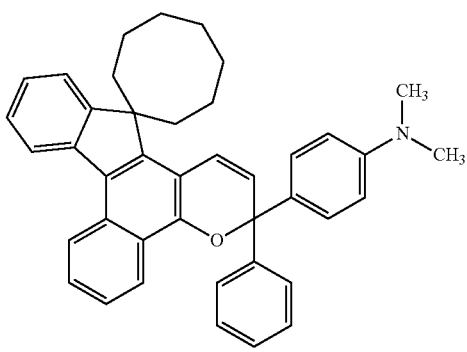

-continued

PC 2

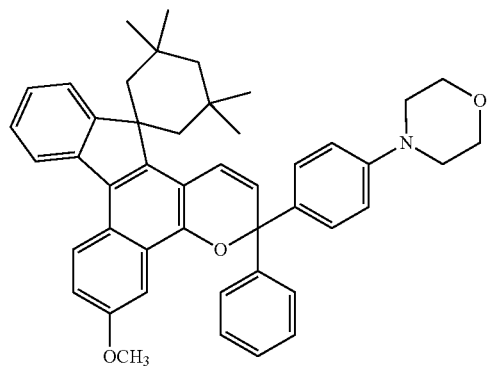

PC 3

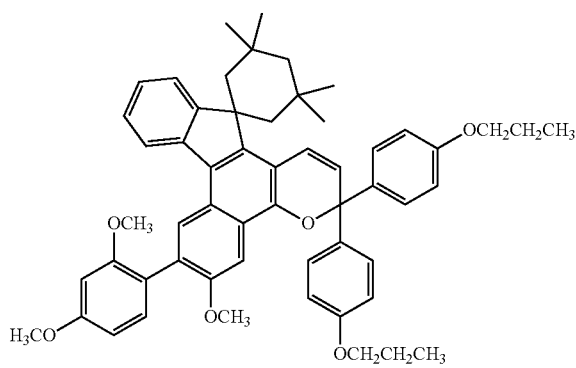

Other Compounding Agents (Additives)
Stabilizer
HALS: bis(1,2,2,6,6-pentamethyl-4-piperidyl)sebacate (molecular weight of 508)
HP: ethylenebis(oxyethylene)bis[3-(5-tert-butyl-4-hydroxy-m-tolyl)propionate] (manufactured by CIBA SPECIALTY CHEMICALS INC., Irganox 245)
Thermal Polymerization Initiator
ND: t-butyl peroxyneodecanoate (trade name: Perbutyl ND, manufactured by NOF Corporation)
Optical Polymerization Initiator
PI: phenylbis(2,4,6-trimethylbenzoyl)-phosphine oxide (trade name: Irgacure819, manufactured by BASF)
Preparation of Curable Composition (Z1)

10 parts by mass of PMS1 as component (A), 15 parts by mas of M-1 as the component (B), 30 pars by mass of 2,2-bis[4-(methacryloxy.polyethoxy)phenyl]propane (average chain length of ethylene glycol chain: 10, average molecular weight: 804) as the component (C), all of which are polymerizable monomers, 0.3 part by mass of PI as a polymerization initiator and 0.1 part by weight of L7001 of Toray Dow Corning Corporation as a leveling agent were added and fully mixed together under agitation at 70° C. for 15 minutes to obtain a composition (Z1) for use in the coating method. The amounts of these components are shown in Table 2.

Preparation of Curable Compositions (Z2) to (Z24)

Compositions (Z2) to (Z24) were prepared in the same manner as the above curable composition (Z1) except that materials shown in Table 2 were used. The compositions are shown in Table 2. Z3 to Z13 and Z15 to Z24 are photochromic curable compositions.

TABLE 2

| Curable compositions | Component (A) (parts by mass) | Component (B) (parts by mass) | Component (C) (parts by mass) | Component (D) (parts by mass) | Other polymerizable monomers (parts by mass) | Additives (parts by mass) | Initiator (parts by mass) |
|---|---|---|---|---|---|---|---|
| Z1  | PMS1(10) | M-1(15) | BPE500 (30) | — | — | — | PI (0.3) |
| Z2  | PMS3(10) | M-1(15) | BPE500 (30) | — | TMPT/14G/9G/GMA/MA1 (19/15/10/1/3) | — | PI (0.3) |
| Z3  | PMS1(10) | M-1(15) | BPE500 (30) | PC1/PC2/PC3 (0.3/0.4/2.2) | TMPT/14G/9G/GMA/MA1 (19/15/10/1/3) | HALS(5)/ HP(3) | PI (0.3) |
| Z4  | PMS2(10) | M-1(15) | BPE500 (30) | PC1/PC2/PC3 (0.3/0.4/2.2) | TMPT/14G/9G/GMA/MA1 (19/15/10/1/3) | HALS(5)/ HP(3) | PI (0.3) |
| Z5  | PMS3(10) | M-1(15) | BPE500 (30) | PC1/PC2/PC3 (0.3/0.4/2.2) | TMPT/14G/9G/GMA/MA1 (19/15/10/1/3) | HALS(5)/ HP(3) | PI (0.3) |
| Z6  | PMS4(10) | M-1(15) | BPE500 (30) | PC1/PC2/PC3 (0.3/0.4/2.2) | TMPT/14G/9G/GMA/MA1 (19/15/10/1/3) | HALS(5)/ HP(3) | PI (0.3) |
| Z7  | PMS5(10) | M-1(15) | BPE500 (30) | PC1/PC2/PC3 (0.3/0.4/2.2) | TMPT/14G/9G/GMA/MA1 (19/15/10/1/3) | HALS(5)/ HP(3) | PI (0.3) |
| Z8  | PMS3(10) | M-1(10) | BPE500 (40) | PC1/PC2/PC3 (0.3/0.4/2.2) | TMPT/14G/9G/GMA/MA1 (19/15/1/3) | HALS(5)/ HP(3) | PI (0.3) |
| Z9  | PMS3(10) | M-1(5) | BPE500 (40) | PC1/PC2/PC3 (0.3/0.4/2.2) | TMPT/14G/GMA/MA1 (24/20/1/3) | HALS(5)/ HP(3) | PI (0.3) |
| Z10 | PMS3(10) | M-1(2) | BPE500 (60) | PC1/PC2/PC3 (0.3/0.4/2.2) | TMPT/14G/GMA/MA1 (15/12/1/3) | HALS(5)/ HP(3) | PI (0.3) |
| Z11 | PMS3(5)  | M-1(15) | BPE500 (35) | PC1/PC2/PC3 (0.3/0.4/2.2) | TMPT/14G/GMA/MA1 (24/20/1/3) | HALS(5)/ HP(3) | PI (0.3) |
| Z12 | PMS3(2)  | M-1(15) | BPE500 (35) | PC1/PC2/PC3 (0.3/0.4/2.2) | TMPT/14G/GMA/MA1 (24/23/1/3) | HALS(5)/ HP(3) | PI (0.3) |
| Z13 | PMS4(10) | M-2(15) | BPE2 (30) | PC1/PC2/PC3 (0.3/0.4/2.2) | D-TMP/14G/A400/GMA/MA1 (24/10/10/1/3) | HALS(5)/ HP(3) | PI (0.3) |
| Z14 | PMS7(10) | M-1(15) | BPE500 (30) | — | — | — | PI (0.3) |
| Z15 | PMS1(10) | — | BPE500 (45) | PC1/PC2/PC3 (0.3/0.4/2.2) | TMPT/14G/9G/GMA/MA1 (19/15/10/1/3) | HALS(5)/ HP(3) | PI (0.3) |
| Z16 | PMS6(10) | M-1(15) | BPE500 (30) | PC1/PC2/PC3 (0.3/0.4/2.2) | TMPT/14G/9G/GMA/MA1 (19/15/10/1/3) | HALS(5)/ HP(3) | PI (0.3) |

TABLE 2-continued

| Curable compositions | Component (A) (parts by mass) | Component (B) (parts by mass) | Component (C) (parts by mass) | Component (D) (parts by mass) | Other polymerizable monomers (parts by mass) | Additives (parts by mass) | Initiator (parts by mass) |
|---|---|---|---|---|---|---|---|
| Z17 | PMS7(10) | M-1(15) | BPE500 (30) | PC1/PC2/PC3 (0.3/0.4/2.2) | TMPT/14G/9G/GMA/MA1 (19/15/10/1/3) | HALS(5)/ HP(3) | PI (0.3) |
| Z18 | PMS1(10) | M-1(10) | BPE500 (30) | PC1/PC2/PC3 (0.03/0.04/0.2) | TMPT/14G/9G/GMA/MS/MSD/MA2 (15/15/10/1/6/3/5) | HALS(0.2)/ HP(0.1) | ND (1.0) |
| Z19 | PMS2(10) | M-1(10) | BPE500 (30) | PC1/PC2/PC3 (0.03/0.04/0.2) | TMPT/14G/9G/GMA/MS/MSD/MA2 (15/15/10/1/6/3/5) | HALS(0.2)/ HP(0.1) | ND (1.0) |
| Z20 | PMS3(10) | M-1(10) | BPE500 (30) | PC1/PC2/PC3 (0.03/0.04/0.2) | TMPT/14G/9G/GMA/MS/MSD/MA2 (15/15/10/1/6/3/5) | HALS(0.2)/ HP(0.1) | ND (1.0) |
| Z21 | PMS4(10) | M-1(10) | BPE500 (30) | PC1/PC2/PC3 (0.03/0.04/0.2) | TMPT/14G/9G/GMA/MS/MSD/MA2 (15/15/10/1/6/3/5) | HALS(0.2)/ HP(0.1) | ND (1.0) |
| Z22 | PMS1(10) | — | BPE500 (40) | PC1/PC2/PC3 (0.03/0.04/0.2) | TMPT/14G/9G/GMA/MS/MSD/MA2 (15/15/10/1/6/3/5) | HALS(0.2)/ HP(0.1) | ND (1.0) |
| Z23 | PMS6(10) | M-1(10) | BPE500 (30) | PC1/PC2/PC3 (0.03/0.04/0.2) | TMPT/14G/9G/GMA/MS/MSD/MA2 (15/15/10/1/6/3/5) | HALS(0.2)/ HP(0.1) | ND (1.0) |
| Z24 | PMS7(10) | M-1(10) | BPE500 (30) | PC1/PC2/PC3 (0.03/0.04/0.2) | TMPT/14G/9G/GMA/MS/MSD/MA2 (15/15/10/1/6/3/5) | HALS(0.2)/ HP(0.1) | ND (1.0) |

<Production of Laminate by Coating Method>

Example 1

An allyl-based plastic lens having a center thickness of 2 mm, a bevel of 45°, a refractive index of 1.50 and a beveled shape was prepared as a plastic lens substrate. This allyl-based plastic lens was subjected to alkali etching at 50° C. for 5 minutes by using a 10% sodium hydroxide aqueous solution and fully washed with distilled water in advance.

A moisture curable primer (trade name; TR-SC-P, manufactured by Tokuyama Corporation) was applied to the surface of the above plastic lens at a revolution of 70 rpm for 15 seconds and then at 1,000 rpm for 10 seconds by means of a spin coater (1H-DX2 of MIKASA Corporation). Then, about 2 g of the above curable composition (Z1) was applied to the surface of the optical substrate having the above primer coating layer by means of the 1H-DX2 spin coater of MIKASA Corporation. The optical substrate coated with the coating film of the above photochromic composition was exposed to light with the F3000SQ of Fusion UV Systems which is equipped with a D valve and adjusted to obtain an output of 200 mW/cm$^2$ at 405 nm on the surface of the optical substrate in a nitrogen gas atmosphere for 90 seconds to cure the coating film. Thereafter, the plastic lens was heated at 100° C. for 1 hour in a thermostat to obtain a laminate. The thickness of the coating layer obtained by adjusting the spin coating conditions was set to 40±1 μm.

The following evaluations 1) to 7) were made on the laminate obtained by the above method. As a result, the laminate had a Vickers (HL) hardness of 8.3, an adhesion of 100, a boiling adhesion of 100, a number of cracked substrates in appearance evaluation of 0, a tensile strength of 15.0 kgf and a shrinkage factor of 7.0%. Further, when a storage stability test was made on the curable composition (Z1) for 6 weeks, the composition was not clouded.

[Specimen Evaluation Method]

1) Vickers (HL) Hardness

Vickers hardness was measured with the PMT-X7A micro-Vickers hardness meter (of Matsuzawa Co., Ltd.). A square pyramid type diamond indenter was used to carry out the evaluation of Vickers hardness under a load of 10 gf for an indenter retention time of 30 seconds. After this measurement was made 4 times in total, an average value of three measurement data excluding a first one with a large measurement error was given.

2) Adhesion

Adhesion was evaluated by a cross-cut tape test in accordance with JISD-0202. That is, a cutter knife was used to make cuts in the surface of the obtained laminate at intervals of about 1 mm so as to form 100 squares. A cellophane adhesive tape (Cellotape (registered trademark) of Nichiban Co., Ltd.) was strongly attached to the surface and then peeled off at a stretch in a 90° direction from the surface to count the number of squares left behind of the photochromic layer.

3) Boiling Adhesion

After a laminate as a test specimen was immersed in boiling distilled water, the laminate was taken out every hour, water drops were wiped off from the laminate, and the laminate was left at room temperature for 1 hour to evaluate adhesion in the same manner as in 2). This test was repeated until the total boiling time became 5 hours to count the number of squares left in the same manner as in 2). The evaluation result is expressed by test time during which adhesion was retained (not less than 95/100).

4) Evaluation of Appearance 10 laminates were manufactured to evaluate the appearance with the number of laminates which were cracked in the coating layer.

5) Storage Stability (Promotion Test)

20 g of the above composition was weighed, put into a brown glass tube covered with a cap having a screw and kept in a thermostat heated at 40° C. Visual evaluation was made every week until the storage period became 8 weeks to check whether the composition was clouded (phase separation) or not. The evaluation result is expressed as the longest period (weeks) during which the composition was not clouded. Eight weeks of this promotion test at 40° C. is equivalent to about one year of the storage of an ordinary composition at 5 to 10° C.

6) Tensile Strength

The above composition was injected into a mold composed of two glass plates and a gasket made of an ethylene-vinyl acetate polymer and exposed to light with the F3000SQ of Fusion UV Systems which is equipped with a D valve and adjusted to obtain an output of 200 mW/cm$^2$ at 405 nm for 90 seconds. After exposure, the cured product was taken out from the glass mold to obtain a cured product having a thickness of 2 mm. A test specimen measuring 20 mm×40 mm was cut out from the obtained cured product, two holes having a diameter of 2 mm were drilled to ensure that centers thereof were located at positions 5 mm from the ends of the short sides and at positions 10 mm from the ends of the long sides, and a stainless steel rod having a diameter of 1.6 mm was inserted into the two holes and fixed to the upper and lower chucks of a tensile tester while the test specimen penetrated the holes to measure tensile strength when they were pulled at a speed of 5 mm/min.

7) Shrinkage Factor

When the specific gravity of the above composition was measured with a density hydrometer and designated as specific gravity 1 and the specific gravity of a cured product obtained by the same method as in 6) was measured and designated as specific gravity 2, the shrinkage factor (%) was calculated from specific gravity 2/specific gravity 1×100.

Example 3

A photochromic laminate was manufactured from the curable composition (Z3) comprising a photochromic compound in the same manner as in Example 1, and photochromic properties shown in 8) thereof were evaluated in addition to the evaluations 1) to 7). As a result, the photochromic laminate had a Vickers (HL) hardness of 7.5, an adhesion of 100, a boiling adhesion of 100 and a number of cracked laminates in appearance evaluation of 0, a maximum absorption wavelength of 581 nm, a color optical density of 1.0 and a fading speed of 45 seconds all of which are photochromic properties, a tensile strength of 13.0 kgf and a shrinkage factor of 8.5%. Further, when a storage stability test was made on the curable composition (Z3) for 8 weeks, the composition was not clouded.

[Specimen Evaluation Methods]

8) Photochromic Properties

A photochromic laminate obtained by curing a composition comprising a photochromic compound (thickness of photochromic coating layer: 40±1 µm) was used as a specimen and exposed to light having a beam intensity at 365 nm of 2.4 mW/cm$^2$ on the surface of the polymer and at 245 nm of 24 µW/cm$^2$ with the L-2480 (300W) SHL-100 xenon lamp of Hamamatsu Photonics K.K. through an aero-mass filter (of Corning Incorporated) at 20° C.±1° C. for 120 seconds to develop color so as to measure the photochromic properties of the above laminate. The photochromic properties were evaluated by the following methods.

Maximum absorption wavelength (λmax): maximum absorption wavelength after color development obtained by the spectrophotometer (instantaneous multi-channel photodetector MCPD1000) of Otsuka Electronics Co., Ltd. The maximum absorption wavelength is connected with color at the time of color development.

Color optical density {ε(120)–ε(0)}: difference between absorbance {ε(120)} after 120 seconds of irradiation at the above maximum absorption wavelength and absorbance ε(0) before irradiation. It can be said that as this value becomes larger, photochromic properties become more excellent. The color which was developed outdoors was evaluated visually.

Fading speed [t½ (sec.)]: time elapsed until the absorbance at the above maximum wavelength of the specimen drops to ½ of {ε(120)–ε(0)} when irradiation is continued for 120 seconds and then stopped. It can be said that as the time becomes shorter, photochromic properties become more excellent.

Examples 2, 4-13, Comparative Examples 1-4

Laminates were manufactured in the same manner as in Examples 1 and 3 except that curable compositions shown in Table 3 were used. Evaluation results are shown in Table 3.

TABLE 3

| No. | Curable composition | HL hardness | Adhesion | Boiling adhesion | Appearance evaluation (a sheet of laminate) | Storage stability (weeks) |
|---|---|---|---|---|---|---|
| Ex. 1 | Z1 | 8.3 | 100 | 100 | 0 | 6 |
| Ex. 2 | Z2 | 7.5 | 100 | 100 | 0 | 8 |
| Ex. 3 | Z3 | 7.5 | 100 | 100 | 0 | 6 |
| Ex. 4 | Z4 | 7.5 | 100 | 100 | 0 | 8 |
| Ex. 5 | Z5 | 7.5 | 100 | 100 | 0 | 8 |
| Ex. 6 | Z6 | 7.5 | 100 | 100 | 0 | 8 |
| Ex. 7 | Z7 | 7.5 | 100 | 100 | 2 | 8 |
| Ex. 8 | Z8 | 7.7 | 100 | 100 | 0 | 8 |
| Ex. 9 | Z9 | 8.0 | 100 | 100 | 2 | 6 |
| Ex. 10 | Z10 | 8.2 | 100 | 100 | 0 | 5 |
| Ex. 11 | Z11 | 5.5 | 100 | 100 | 0 | 8 |
| Ex. 12 | Z12 | 5.1 | 100 | 100 | 0 | 8 |
| Ex. 13 | Z13 | 7.3 | 100 | 100 | 0 | 8 |
| C. Ex. 1 | Z14 | 8.3 | 100 | 100 | 0 | 2 |
| C. Ex. 2 | Z15 | 8.3 | 100 | 100 | 4 | 8 |
| C. Ex. 3 | Z16 | 7.5 | 100 | 100 | 0 | 3 |
| C. Ex. 4 | Z17 | 7.6 | 100 | 100 | 4 | 8 |

| No. | Tensile strength (kgf) | Shrinkage factor (%) | Maximum absorption wavelength (λmax) | Color optical density | Fading speed (seconds) |
|---|---|---|---|---|---|
| Ex. 1 | 15.0 | 7.0 | — | — | — |
| Ex. 2 | 14.0 | 8.5 | — | — | — |
| Ex. 3 | 14.0 | 8.5 | 581 | 1.0 | 45 |
| Ex. 4 | 14.0 | 8.6 | 581 | 1.0 | 44 |
| Ex. 5 | 14.0 | 8.5 | 581 | 1.0 | 45 |
| Ex. 6 | 13.7 | 8.5 | 581 | 1.0 | 44 |
| Ex. 7 | 13.0 | 8.8 | 581 | 1.0 | 47 |
| Ex. 8 | 14.5 | 8.5 | 581 | 1.0 | 47 |
| Ex. 9 | 12.7 | 8.7 | 581 | 1.0 | 53 |
| Ex. 10 | 14.3 | 8.5 | 583 | 1.0 | 65 |
| Ex. 11 | 15.0 | 8.9 | 581 | 0.9 | 60 |
| Ex. 12 | 15.5 | 9.1 | 581 | 0.9 | 65 |
| Ex. 13 | 14.1 | 8.6 | 581 | 1.0 | 43 |
| C. Ex. 1 | 15.0 | 7.0 | — | — | — |
| C. Ex. 2 | 12.0 | 9.5 | 584 | 0.9 | 75 |
| C. Ex. 3 | 14.1 | 8.5 | 581 | 1.0 | 45 |
| C. Ex. 4 | 12.2 | 9.1 | 581 | 1.0 | 50 |

Ex.: Example,
C. Ex.: Comparative Example

As obvious from Examples 1 to 13, laminates obtained by polymerizing the curable composition of the present invention and the photochromic composition are excellent in appearance, adhesion, surface hardness and photochromic properties. Further, the curable composition and the photochromic composition were satisfactory in terms of storage stability. However, in Comparative Examples 1 to 4, the laminates and the photochromic laminates were unsatisfactory in terms of at least one physical property out of appearance, adhesion, surface hardness, photochromic properties and the storage stabilities of the curable composition and the photochromic composition. There was no laminate which satisfied the requirements for all the above physical properties.

<Production of Laminate by Two-stage Polymerization Method>

Example 14

A photochromic curable composition (Z18) was injected into a mold sandwiched between a glass plate and an allyl-based plastic lens having a center thickness of 2 mm, a bevel of 45°, a refractive index of 1.50 and a beveled shape by using a gasket made of an ethylene-vinyl acetate copolymer to carry out cast polymerization. This plastic lens was subjected to alkali etching by using a 10% sodium hydroxide aqueous solution at 50° C. for 5 minutes and then fully washed with distilled water in advance.

Polymerization was carried out in an air furnace by gradually raising the temperature from 30° C. to 90° C. over 18 hours and keeping the temperature at 90° C. for 2 hours, and the glass plate was removed after the end of polymerization to obtain a photochromic laminate having a 0.3 mm-thick photochromic layer of the photochromic composition and a 2 mm-thick plastic lens substrate adhered to the above layer. The Vickers hardness, photochromic properties, adhesion, appearance, the storage stability of the photochromic curable composition, tensile strength and shrinkage factor of the obtained laminate were evaluated in the same manner as in Example 3. The results are shown in Table 4.

Examples 15-17, Comparative Examples 5-7

Photochromic laminates were manufactured and evaluated in the same manner as in Example 14 except that photochromic compositions shown in Table 4 were used. The evaluation results are shown in Table 4.

TABLE 4

| No. | Curable composition | HL hardness | Adhesion | Boiling adhesion | Appearance evaluation (a sheet of laminate) | Storage stability (weeks) |
| --- | --- | --- | --- | --- | --- | --- |
| Ex. 14 | Z18 | 7.5 | 100 | 100 | 0 | 6 |
| Ex. 15 | Z19 | 7.5 | 100 | 100 | 0 | 8 |
| Ex. 16 | Z20 | 7.5 | 100 | 100 | 0 | 8 |
| Ex. 17 | Z21 | 7.5 | 100 | 100 | 0 | 8 |
| C. Ex. 5 | Z22 | 8.3 | 100 | 100 | 4 | 4 |
| C. Ex. 6 | Z23 | 7.5 | 100 | 100 | 0 | 3 |
| C. Ex. 7 | Z24 | 7.6 | 100 | 100 | 5 | 8 |

| No. | Tensile strength (kgf) | Shrinkage factor (%) | Maximum absorption wavelength (λmax) | Color optical density | Fading speed (seconds) |
| --- | --- | --- | --- | --- | --- |
| Ex. 14 | 14.3 | 8.5 | 581 | 1.0 | 46 |
| Ex. 15 | 14.3 | 8.6 | 581 | 1.0 | 46 |
| Ex. 16 | 14.3 | 8.5 | 581 | 1.0 | 46 |
| Ex. 17 | 14.3 | 8.5 | 581 | 1.0 | 47 |
| C. Ex. 5 | 11.4 | 9.7 | 581 | 1.0 | 75 |
| C. Ex. 6 | 13.7 | 8.5 | 581 | 1.0 | 46 |
| C. Ex. 7 | 11.8 | 9.4 | 581 | 1.0 | 52 |

Ex.: Example
C. Ex.: Comparative Example

As obvious from Examples 14-17, a photochromic laminate obtained from the photochromic curable composition of the present invention by the two-stage polymerization method is excellent in appearance, adhesion, surface hardness and photochromic properties. Further, the storage stability of the photochromic composition was satisfactory. However, in Comparative Examples 5 to 7, at least one physical property out of the photochromic properties, appearance, adhesion and surface hardness of the photochromic laminates and the storage stability of the photochromic composition was unsatisfactory, and there was no laminate which satisfied the requirements for all the above physical properties.

Effect of the Invention

According to the present invention, there can be provided a curable composition which has excellent mechanical strength and excellent storage stability when it is stored for a long time by using a silsesquioxane monomer having a low content of a high-molecular weight component and a specific (meth)acrylate monomer having a polycarbonate group as a bifunctional polymerizable monomer. Therefore, this composition can be used for various applications of transparent plastics such as plastic spectacle lenses.

When a photochromic curable composition is prepared by containing a photochromic compound in the above curable composition of the present invention, there can be provided a photochromic curable composition having excellent storage stability after it is stored for a long time while retaining excellent mechanical strength and photochromic properties advantageously.

The invention claimed is:

1. A curable composition comprising (A) a silsesquioxane monomer having a radically polymerizable group in the molecule, a weight average molecular weight measured by gel permeation chromatography (GPC) of 2,000 to 4,700 and a content of a component having a weight average molecular weight of not less than 10,000 of less than 9 mass % and (B) a bifunctional polymerizable monomer represented by the following formula (1),

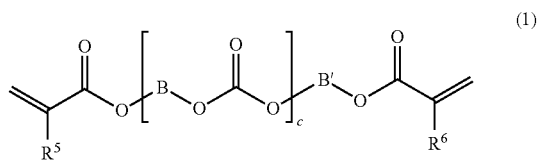

wherein B and B' are each a linear or branched alkylene group having 2 to 15 carbon atoms, "c" is an average number of 1 to 20, when a plurality of B's are existent, B's may be the same or different, and $R^5$ and $R^6$ are each a hydrogen atom or methyl group.

2. The curable composition according to claim 1, wherein the content of a component having a ladder structure and/or random structure in the silsesquioxane monomer is 60 to 90 mass %.

3. The curable composition according to claim 1, wherein the content of the silsesquioxane monomer (A) is 10 to 90 parts by mass and the content of the bifunctional polymerizable monomer (B) is 10 to 90 parts by mass based on 100 parts by mass of the total of the silsesquioxane monomer (A) and the bifunctional polymerizable monomer (B).

4. The curable composition according to claim 1 further comprising (C) a bifunctional polymerizable monomer represented by the following formula (3),

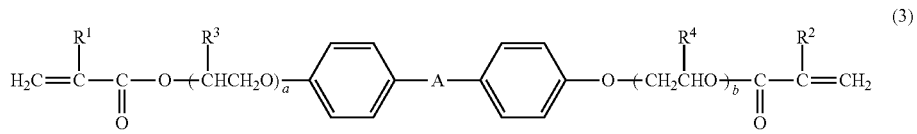
(3)

wherein $R^1$ and $R^2$ are each a hydrogen atom or methyl group, $R^3$ and $R^4$ are each a hydrogen atom or methyl group, A is any one of groups represented by the following formulas:

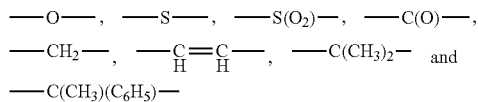

"a" and "b" are each an integer of 1 or more, with the proviso that when both $R^1$ and $R^2$ are methyl groups, (a+b) is an average value of 2 or more and less than 30, when $R^1$ is a methyl group and $R^2$ is a hydrogen atom, (a+b) is an average value of 2 or more and less than 25, and when both $R^1$ and $R^2$ are hydrogen atoms, (a+b) is an average value of 2 or more and less than 20.

5. The curable composition according to claim 4, wherein the content of the silsesquioxane monomer (A) is 3 to 30 parts by mass, the content of the bifunctional polymerizable monomer (B) is 2 to 40 parts by mass and the content of the bifunctional polymerizable monomer (C) is 30 to 95 parts by mass based on 100 parts by mass of the total of the silsesquioxane monomer (A), the bifunctional polymerizable monomer (B) and the bifunctional polymerizable monomer (C).

6. A photochromic curable composition further comprising (D) a photochromic compound in the composition of claim 1.

7. The photochromic curable composition according to claim 6, wherein the content of the photochromic compound (D) is 0.1 to 10 parts by mass based on 100 parts by mass of the total of all the monomers (A), (B) and (C).

8. A photochromic cured product obtained by curing the photochromic curable composition of claim 6.

9. A photochromic laminate having a photochromic coating layer which is a cured product of the photochromic curable composition of claim 6 on a lens substrate.

10. A photochromic curable composition further comprising (D) a photochromic compound in the composition of claim 2.

11. A photochromic curable composition further comprising (D) a photochromic compound in the composition of claim 3.

12. A photochromic curable composition further comprising (D) a photochromic compound in the composition of claim 4.

13. A photochromic curable composition further comprising (D) a photochromic compound in the composition of claim 5.

* * * * *